US009768809B2

United States Patent
Tertinek et al.

(10) Patent No.: US 9,768,809 B2
(45) Date of Patent: Sep. 19, 2017

(54) DIGITAL-TO-TIME CONVERTER SPUR REDUCTION

(71) Applicant: Intel IP Corporation, Santa Clara, CA (US)

(72) Inventors: Stefan Tertinek, Linz (AT); Peter Preyler, Weyer (AT); Thomas Mayer, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/318,829

(22) Filed: Jun. 30, 2014

(65) Prior Publication Data

US 2015/0381214 A1  Dec. 31, 2015

(51) Int. Cl.

| H04B 1/00 | (2006.01) |
| H04B 7/06 | (2006.01) |
| H04W 88/06 | (2009.01) |
| H04L 27/14 | (2006.01) |
| G04F 10/00 | (2006.01) |

(52) U.S. Cl.
CPC ......... *H04B 1/0082* (2013.01); *G04F 10/005* (2013.01)

(58) Field of Classification Search
CPC .... H04W 88/06; H04L 27/20; H04L 27/2337; H04L 27/2003; H04L 27/233; H04L 27/14; H04L 27/227; H04B 7/06; H04B 10/50; H04B 10/04; H04B 10/00; H04B 1/0082; H04B 1/00; H03H 11/265; H03H 11/26; G04F 10/005; G04F 10/00
See application file for complete search history.

(56) References Cited

U.S. PATENT DOCUMENTS

| 6,060,928 A * | 5/2000 | Jun ........................ G11C 7/222 327/152 |
| 7,982,638 B2 * | 7/2011 | Yamaguchi ............. H03M 9/00 341/101 |
| 8,497,716 B2 * | 7/2013 | Zhang ................... H03L 7/1976 327/147 |
| 8,855,215 B2 * | 10/2014 | Roberts ................... G06F 1/022 375/247 |
| 8,909,065 B2 * | 12/2014 | Henzler ................. H04B 10/50 398/183 |
| 9,071,304 B2 * | 6/2015 | Banin ...................... H03M 1/66 |
| 2002/0101271 A1 * | 8/2002 | Tanahashi .............. H03K 5/131 327/279 |
| 2007/0222493 A1 * | 9/2007 | Afentakis .............. H03K 5/133 327/276 |

(Continued)

FOREIGN PATENT DOCUMENTS

| CN | 105281790 A | 1/2016 |
| DE | 102015006783 A1 | 12/2015 |

*Primary Examiner* — Pablo Tran
(74) *Attorney, Agent, or Firm* — Schwegman Lundberg & Woessner, P.A.

(57) ABSTRACT

This application discusses, among other things, apparatus and methods for improving spurious frequency performance of digital-to-time converters (DTCs). In an example, a method can include receiving a code at selection logic of a digital-to-time converter at a first instant, selecting a first delay path of the DTC to provide a delay associated with the code, associating a second delay path with the code, receiving the code at the selection logic at a second instant, and selecting the second delay path of the DTC to provide the delay associated with the code.

15 Claims, 3 Drawing Sheets

(56) References Cited

U.S. PATENT DOCUMENTS

| | | | |
|---|---|---|---|
| 2011/0215862 A1* | 9/2011 | La Rosa | G05F 3/24 327/541 |
| 2015/0042310 A1* | 2/2015 | Gazsi | G01R 13/0272 324/76.24 |
| 2015/0172083 A1* | 6/2015 | Meier | H04L 27/2003 375/324 |
| 2015/0181643 A1* | 6/2015 | Lakdawala | H04B 7/06 375/299 |

* cited by examiner

US 9,768,809 B2

DIGITAL-TO-TIME CONVERTER SPUR REDUCTION

BACKGROUND

Digital to time converters (DTC) are planned to be introduced in cellular radio circuits. DTCs can simplify radio architectures for wideband LTE (LTE-A), multiple-input multiple-output (MIMO) uplink, inter-band and non-contiguous intra-band carrier aggregation by eliminating the need for a local oscillator for each transmission and reception frequency. DTCs can often include multiple stages to provide a desired frequency or desired phase modulation. Some stages can include an interpolator circuit to provide an output phase signal related to temporally offset signals generated by upstream stages of the DTC. In certain situations, processing path characteristics of the DTC can cause significant frequency spurs by up-converting in frequency correlated circuit noise.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Digital polar transmitter (DPTX) architectures are very attractive for modern radios, because such architectures can provide improved area and power consumption characteristics compared with conventional analog architectures. A digital-to-time converter (DTC) is a component in certain examples of DPTX which can modulate a local oscillator carrier with phase information for a transmission signal. An example DTC architecture can be segmented into a coarse phase segment and a fine phase modulation segment. Other example DTC architectures can include a static divider with multiplexer phase-selection or a multi-modulus divider for coarse phase segment. In certain examples, fine granularity control of the DTC can include a digitally controlled edge interpolator (DCEI) topology. Spurious frequency performance of a DTC can be a requirement that reflects on the robustness of a DTC-based local oscillator. The present inventors have recognized that a class of spurs can be caused by correlated circuit noise being up-converted in frequency. Such up-conversion can result from input edges that cyclically take the same path as they propagate through the stages of the DTC. For example, if an LO signal is generated by periodically multiplexing one of two coarsely-separated edges from first stage to a second stage, edge jitter on the LO signal can be cyclical due to correlated noise of each MUX path. The cyclical nature of the correlated noise can cause an up-conversion of the noise according to the period of the cyclic selection and can be seen as spurs in the frequency domain. Note that noise-induced spurs do not typically occur in significant magnitude with polar transmitters using a DTC-based phase modulation path, as the stages inside the DTC are selected according to the phase-modulation data which is typically not periodic.

Figure 1:
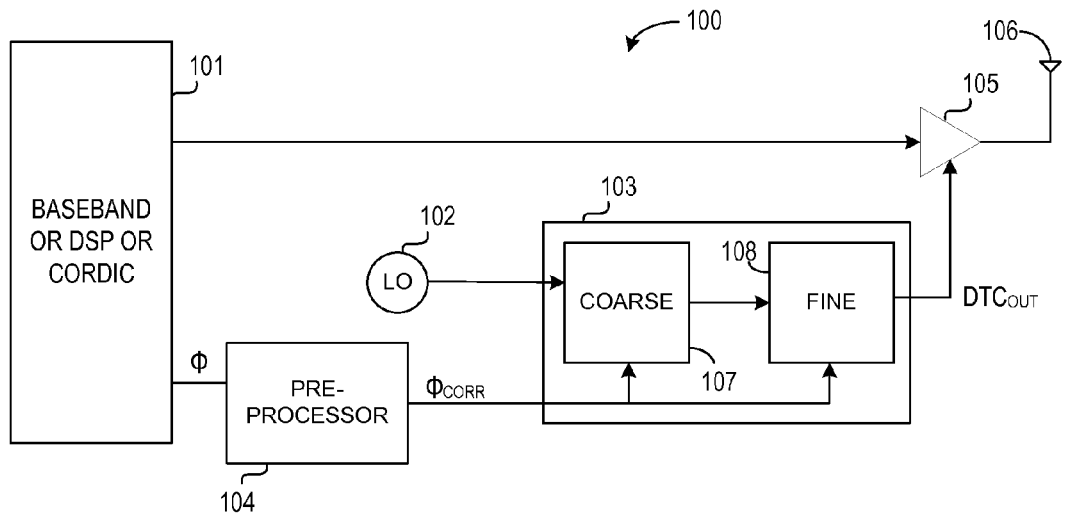
FIG. 1 illustrates generally an example DTC-based architecture.

FIG. 1 illustrates generally an example DTC-based architecture 100. The illustrated DTC-based architecture is shown for an example transmitter radio circuit. It is understood that DTCs can also be employed in receiver radio circuits to provide a desired receiver radio frequency. In certain examples, the DTC-based architecture 100 can include a processor 101, a local oscillator 102, a DTC 103, a preprocessor 104 for the DTC 103, a power amplifier 105, and an antenna 106. In certain examples, the processor 101 can include a baseband processor such as for a mobile electronic device, a digital signal processor (DSP) or a Cordic converter for providing amplitude and phase modulation information representative of digital transmission data. In certain examples, some known non-linearity of the architecture 100 can be compensated for using the preprocessor 104 for the DTC. In some examples, the preprocessor 104 can receive phase modulation information from the processor 101. In some examples the preprocessor 104 can receive phase ramp information ($\psi$) for providing a desired radio frequency. In certain examples, the preprocessor 104 can adjust or correct the received processor information to provide corrected information ($\psi_{CORR}$) to compensate for at least some of the non-linearity of the DTC 103. In certain examples, the DTC 103 can receive reference clock information from the local oscillator 102 and the corrected processor information ($\psi_{CORR}$) from the preprocessor 104. The DTC 103 can provide an output signal ($DTC_{OUT}$) at a desired frequency using the local oscillator 102 and the corrected processor information ($\psi_{CORR}$). For transmitter examples, the power amplifier 105 can mix the output signal ($DTC_{OUT}$) with data information to provide a transmission signal. The antenna 106 can broadcast the transmission signal for reception by a second device. In certain examples, the DTC 103 can be segmented into stages 107, 108 that sequentially provide finer and finer phase delays.

In certain examples, a radio circuit that can transmit or receive information on multiple distinct frequencies can include a single local oscillator and multiple DTCs, where each DTC can generate a reference signal having a desired frequency of one of the multiple frequencies. Each reference signal can then be used to transmit or receive information using the desired frequency. Such radio circuits can provide significant power savings, and physical space efficiency by employing a single oscillator to generate multiple frequencies. Improved performance can be realized in multi-frequency applications where the multiple frequencies can be selected to avoid side frequencies or harmonics of one another.

Figure 2:
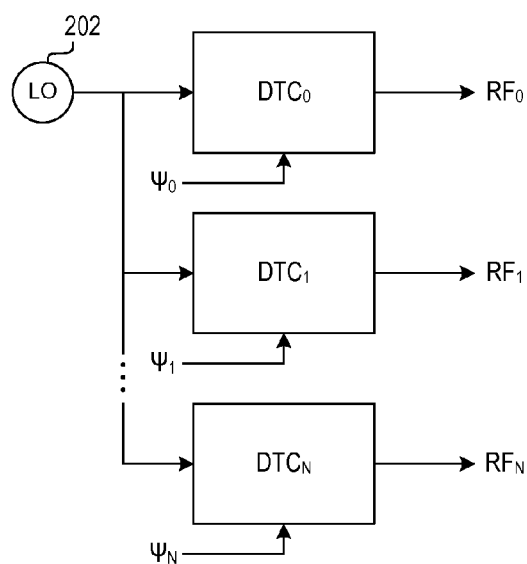
FIG. 2 illustrates generally a portion of an example multiple DTC-based architecture.

FIG. 2 illustrates generally a portion of an example multiple DTC-based architecture. In certain examples, such as for MIMO systems, a single local oscillator 202 can be used with additional DTCs (DTC0, DTC1, . . . , DTCN) to provide additional channel frequencies (RF0, RF1, . . . , RFN). A processor associated with the architecture can provide phase ramp information ($\psi_0, \psi_1, \ldots, \psi_N$) to each DTC. The phase ramp information ($\psi_0, \psi_1, \ldots, \psi_N$) can allow each DTC to provide a desired radio frequency that, in most cases, is different from the frequency of the local oscillator.

In addition to recognizing situations that can diminish spurious frequency performance of a DTC-based local oscillator, the present inventors have recognized an interpolation solution that ensures that edge jitter of the local oscillator signal can be sourced by different circuit components thus breaking periodicity of the noise that can be up-converted to cause a significant frequency spur.

Figure 3:
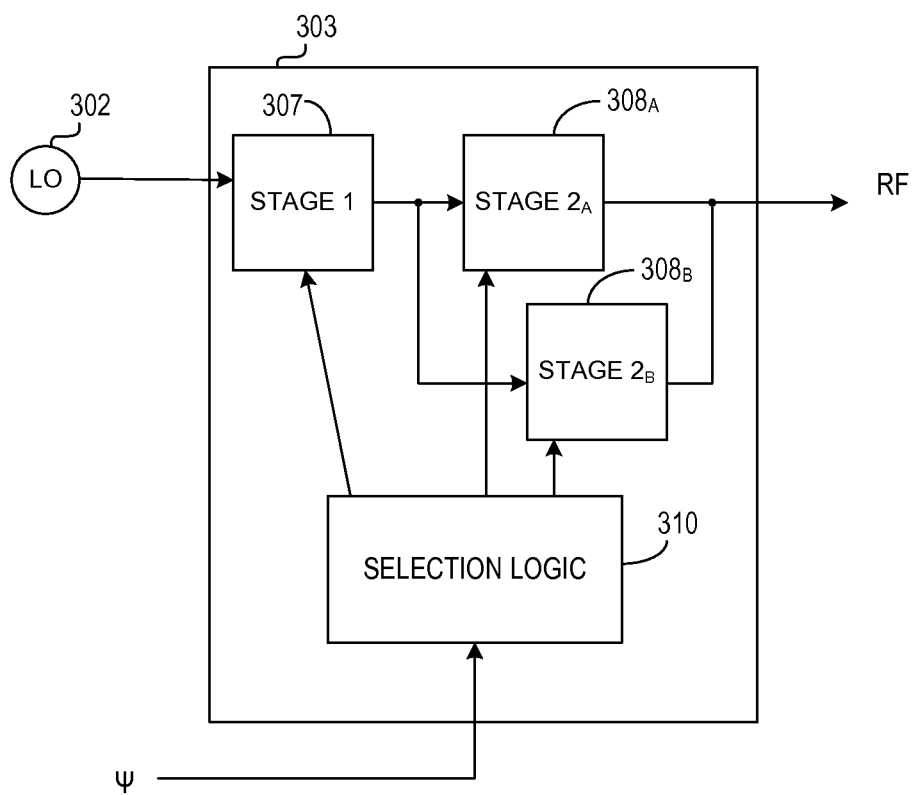
FIG. 3 illustrates generally a local oscillator and an example DTC.

FIG. 3 illustrates generally a local oscillator 302 and an example DTC 303. In certain examples, the DTC 303 can receive reference frequency information, such as an oscillator signal having a first frequency, from the local oscillator 302, and can provide an output signal (RF) having a second frequency. In certain examples, the second frequency is different from the first frequency and can be used to transmit or receive wireless communication signals. In some examples, a communication device such as a mobile communication device can include more than one example DTC 303 to provide or receive multiple wireless radio signals without having a local oscillator for each of the frequency bands of mobile communication device. Referring again to FIG. 3, in certain examples, the DTC 303 can include one or more delay stages 307, $308_A$, $308_B$ and selection logic 310. In some examples, the one or more delay stages 307, $308_A$, $308_B$ can include delay elements, dividers, interpolators, or combinations thereof. The delay stages 307, $308_A$, $308_B$ can receive the reference frequency information or a signal from an upstream stage and can provide a delayed representation of the received signal.

In certain examples, the selection logic 310 can receive frequency setpoint information for providing, for example, the second frequency discussed above. In some examples, the frequency setpoint information can be in the form of codes and can sometimes be referred to as a phrase ramp or phase ramp information ($\psi$). In certain examples, the selection logic 310 can control each stage of the DTC 303 to provide a signal (RF) at the output of the DTC having the frequency selected using the frequency setpoint information. In some examples, the selection logic 310 can select an appropriate delay of the one or more stages of the DTC to provide the frequency selected using the frequency ramp information ($\psi$). In certain examples, the frequency ramp information ($\psi$) can take the form of a code. A particular code can be associated with a particular delay of a stage. In certain examples, a stage of a DTC 303 can include redundant delay paths $308_A$, $308_B$ and the selection logic 310 can track and use different delay paths for a particular code to provide the delay associated with the code but to break any periodicity that can lead to up-conversion of correlated noise that can be generated using a single path for each occurrence of the code. In some examples, a stage can include a first delay path $308_A$ having a first set of components and a second delay path $308_B$ having a second set of component. Each of the first delay path $308_A$ and the second delay path $308_B$ can provide substantially the same delay. In some examples, the second delay path or stage $308_B$ can be a replication of the first delay path or stage $308_A$ and vice versa. In an example, the selection logic 310 can select the first delay path or stage $308_A$ upon receiving a particular code at a first instant and can select the second delay path or stage $308_B$ upon reception of the particular code at a second instant. The inventors have recognized that by using a pattern of different delay paths for a particular code upon successive reception of the code, correlated noise can be prevented from being up-converted and spurious frequency performance of the DTC can be more robust.

In certain examples, the difference between the alternate delay paths $308_A$, $308_B$ of a DTC stage can be minimal, such that the modification provides only a small increment size increase of the DTC 303 compared to a DTC without redundant delay paths. In some cases, the modification can be implemented with spare or extra circuit components already present on the DTC die. For example, a difference between one delay path and an alternative delay path can be the use of one redundant delay element coupled in parallel, such as a switch or multiplexer. In certain examples, the first delay path $308_A$ can include a first multiplexer having a control node coupled to the selection logic 310 and the second delay path $308_B$ can include a second multiplexer having a control node coupled to the selection logic 310. The selection logic 310 can control the control nodes of each of the first and second multiplexers to use alternative delay paths upon successive reception of a particular frequency ramp code. As discussed above, the use of alternative delay paths for a particular frequency ramp code can improve the spurious frequency performance of the DTC by breaking periodicity that can lead to noise up-conversion.

It is understood that although the above examples discuss two alternative paths, additional alternatives paths within the DTC are possible without departing from the scope of the present subject matter. Also, in some examples, the selection logic can select alternatives paths within a DTC for a particular code by selecting different settings for two or more stages where the different settings provide the same desired DTC delay. In such an example, additional DTC delay components are not needed to provide the improved spurious frequency performance.

Figure 4:
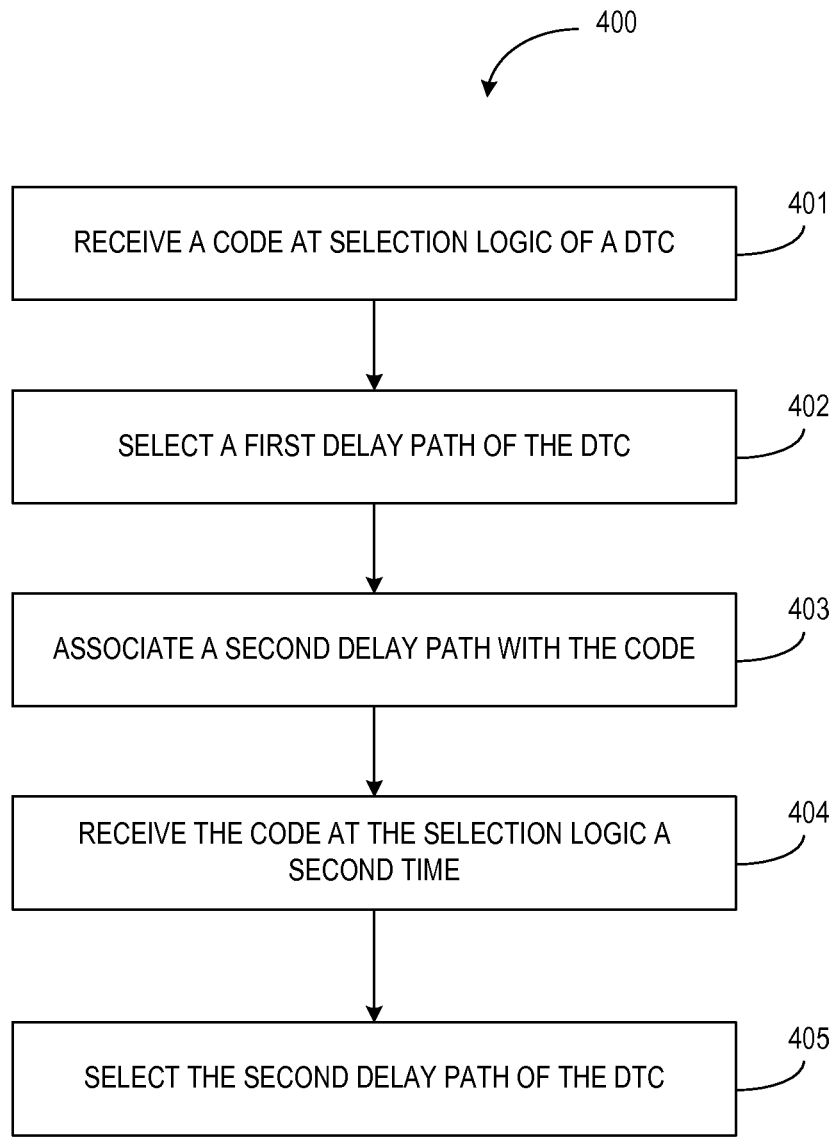
FIG. 4 illustrates generally a flowchart of an example method for reducing spur noise of a DTC.

FIG. 4 illustrates generally a flowchart of an example method 400 for reducing spur noise of a digital-to-time converter (DTC). At 401, the method can include receiving a code at selection logic of the digital-to-time converter at a first instant. At 402, the method can select a first delay path of the DTC to provide a delay associated with the code. At 403, the method can associate a second delay path with the code. In certain examples, the selection of the second delay path can be random. In some examples, the selection of the second path can be done according to a predetermined pattern, such as a pattern that depends on the probability of the code being received in a periodic manner, for example. At 404, the method can include receiving the code at the selection logic at a second instant. At 405, the method can select the second delay path of the DTC to provide the delay associated with the code. In certain examples, selecting an alternative processing path through the DTC for a particular code can include selecting alternative paths through more than one stage of the DTC. For example, a first path can include a first setting for a first stage and a first setting for a second stage, and a second path can include a second setting for the first stage and a second setting for the second stage, where each combination of settings provide the same DTC delay. In certain examples, associating the second delay path with the code can be executed after reception of the code at the second instant. In certain examples, a different delay path can be associated with the code after the reception of the code at the second instant or after processing the code after the second instant. In some examples, the different delay path can include the first delay path. In some examples, the different delay path does not include the first delay path or the second delay path.

Additional Notes

In Example 1, a digital-to-time converter can be configured to receive a local oscillator signal having a first frequency and to provide an output signal having a second frequency different from the first frequency. The DTC can include one or more delay stages for providing the output signal, selection logic configured to receive a first code at a first instant, the first code representative of a frequency ramp for providing a first DTC delay, to provide a first delay setpoint to each of the one or more delay stages, to receive the first code at a second instant, and to provide a second delay setpoint to the one or more delay stages, wherein the first delay setpoint and the second delay setpoint provide the first DTC delay, and wherein the first delay setpoint and the second delay setpoint are configured to select components of at least one of the one or more delay stages differently to provide the first DTC delay.

In Example 2, one stage of the one or more stages of Example 1 optionally includes a first delay path and a second delay path, the second delay path of Example 1 optionally is a representative of the first delay path, the first delay setpoint of Example 1 optionally is configured to select the first delay path at the first instant to provide the first DTC delay, and the second delay setpoint of Example 1 optionally is configured to select the second delay path at the second instant to provide the first DTC delay.

In Example 3, the first delay path of any one or more of Examples 1-2 optionally includes a first delay element of the one stage of the one or more delay stages, and the second delay path any one or more of Examples 1-2 optionally includes a second delay element of the one of the one or more delay stages.

In Example 4, the first delay element of any one or more of Examples 1-3 optionally includes a first multiplexer and the second delay element of any one or more of Examples 1-3 optionally includes a second multiplexer.

In Example 5, a control node of the first multiplexer of any one or more of Examples 1-4 optionally is coupled to a first output of the selection logic, and a control node of the second multiplexer of any one or more of Examples 1-4 optionally is coupled to a second output of the selection logic.

In Example 6, the one or more delay stages of any one or more of Examples 1-5 optionally includes a first delay stage and a second delay stage; the first delay setpoint of any one or more of Examples 1-5 optionally is configured to provide a first delay of the first delay stage and a first delay of the second delay stage, the second delay setpoint of any one or more of Examples 1-5 optionally is configured to provide a second delay of the first stage, and the first delay of the first delay stage of any one or more of Examples 1-5 optionally is different from the second delay of the first delay stage.

In Example 7, the first delay stage of any one or more of Examples 1-6 optionally includes a divider stage, and the second delay stage of any one or more of Examples 1-6 optionally includes a plurality of delay elements.

In Example 8, the first delay stage of any one or more of Examples 1-7 optionally includes a plurality of delay elements and the second delay stage of any one or more of Examples 1-7 optionally includes an interpolator.

In Example 9, a method for reducing spur noise of a digital-to-time converter (DTC) can include receiving a code at selection logic of a digital-to-time converter at a first instant, selecting a first delay path of the DTC to provide a delay associated with the code, associating a second delay path with the code, receiving the code at the selection logic at a second instant, and selecting the second delay path of the DTC to provide the delay associated with the code.

In Example 10, the selecting the first delay path of any one or more of Examples 1-9 optionally includes selecting a first delay for a first delay stage of the DTC, and selecting a second delay for a second delay stage of the DTC. The selecting the second delay path optionally includes selecting a third delay for the first stage of the DTC, and selecting a fourth delay for the second stage of the DTC, wherein the sum of the first delay and the second delay is equal to the sum of the third delay and the fourth delay.

In Example 11, the selecting a second delay path of any one or more of Examples 1-10 optionally includes selecting a second delay path that replicates a delay of the first delay path.

In Example 12, the selecting a first delay path of any one or more of Examples 1-11 optionally includes selecting a first multiplexer to pass a signal of the DTC, and the selecting the second delay path of any one or more of Examples 1-11 optionally includes selecting a second multiplexer coupled in parallel with the first multiplexer.

In Example 13, the selecting the second delay path of any one or more of Examples 1-12 optionally includes associating a third delay path with the code.

In Example 14, the first and third delay path of any one or more of Examples 1-13 optionally are the same delay path.

In Example 15, the third delay path of any one or more of Examples 1-14 optionally does not include the first delay path or the second delay path.

In Example 16, a radio circuit can include a single local oscillator for generating a plurality of carrier signals, the plurality of carrier signals including a plurality of distinct frequencies, the single local oscillator configured to provide a single reference frequency signal, and a plurality of digital-to-time converters (DTCs), each DTC of the plurality of DTCs configured to receive the single reference frequency signal and to provide a carrier signal of the plurality of carrier frequency signals. Each DTC can include one or more delay stages for providing the carrier signal, selection logic configured to receive a first code at a first instant, the first code representative of a frequency ramp for providing a first DTC delay, to provide a first delay setpoint to each of the one or more delay stages, to receive the first code at a second instant, and to provide a second delay setpoint to the one or more delay stages, wherein the first delay setpoint and the second delay setpoint provide the first DTC delay, and wherein the first delay setpoint and the second delay setpoint are configured to select components of at least one of the one or more delay stages differently to provide the first DTC delay.

In Example 17, one of the delay stages of the one or more delay stages of any one or more of Examples 1-16 optionally includes a first delay path and a second delay path, the second delay path of any one or more of Examples 1-16 optionally is a representative of the first delay path, the first delay setpoint of any one or more of Examples 1-16 optionally is configured to select the first delay path at the first instant to provide the first DTC delay, and the second delay setpoint of any one or more of Examples 1-16 optionally is configured to select the second delay path at the second instant to provide the first DTC delay.

In Example 18, the first delay path of any one or more of Examples 1-17 optionally includes a first delay element of one of one of the one or more delay stages, and the second delay path of any one or more of Examples 1-17 optionally includes a second delay element of the one of the one or more delay stages.

In Example 19, the one or more delay stages of any one or more of Examples 1-18 optionally includes a first delay stage and a second delay stage, the first delay setpoint of any one or more of Examples 1-18 optionally is configured to provide a first delay of the first delay stage and a first delay of the second delay stage; the second delay setpoint of any one or more of Examples 1-18 optionally is configured to provide a second delay of the first stage, and the first delay of the first delay stage of any one or more of Examples 1-18 optionally is different from the second delay of the first delay stage.

In Example 20, the first delay stage of any one or more of Examples 1-19 optionally includes a divider stage, and the second delay stage of any one or more of Examples 1-19 optionally includes a plurality of delay elements.

Example 21 can include, or can optionally be combined with any portion or combination of any portions of any one or more of Examples 1 through 20 to include, subject matter that can include means for performing any one or more of the functions of Examples 1 through 20, or a machine-readable medium including instructions that, when performed by a machine, cause the machine to perform any one or more of the functions of Examples 1 through 20.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A digital-to-time converter configured to receive a local oscillator signal having a first frequency and to provide an output signal having a second frequency different from the first frequency, the DTC comprising:
   one or more delay stages for providing the output signal;
   an input coupled to a first delay stage of the one or more delay stages, the input configured to receive the local oscillator signal;
   selection logic configured to receive a first code at a first instant, the first code representative of a frequency ramp for providing a first DTC delay, to provide a first delay setpoint to each of the one or more delay stages, to receive the first code at a second instant, and to provide a second delay setpoint to the one or more delay stages; and
   wherein the selection logic is configured to select components of at least one of the one or more delay stages differently using the first delay setpoint and the second delay setpoint to provide the first DTC delay.

2. The DTC of claim 1, wherein the first delay setpoint and the second delay setpoint provide the first DTC delay.

3. The DTC of claim 1, wherein one stage of the one or more stages includes a first delay path and a second delay path;
   wherein the second delay path is a representative of the first delay path; and
   wherein the first delay setpoint is configured to select the first delay path at the first instant to provide the first DTC delay, and wherein the second delay setpoint is configured to select the second delay path at the second instant to provide the first DTC delay.

4. The DTC of claim 3, wherein the first delay path includes a first delay element of the one stage of the one or more delay stages, and wherein the second delay path includes a second delay element of the one of the one or more delay stages.

5. The DTC of claim 4, wherein the first delay element includes a first multiplexer and the second delay element includes a second multiplexer.

6. The DTC of claim 5, wherein a control node of the first multiplexer is coupled to a first output of the selection logic; and
   wherein a control node of the second multiplexer is coupled to a second output of the selection logic.

7. The DTC of claim 1, wherein the one or more delay stages includes a first delay stage and a second delay stage;
   wherein the first delay setpoint is configured to provide a first delay of the first delay stage and a first delay of the second delay stage;
   wherein the second delay setpoint is configured to provide a second delay of the first stage; and
   wherein the first delay of the first delay stage is different from the second delay of the first delay stage.

8. The DTC of claim 7, wherein the first delay stage includes a divider stage; and
   wherein the second delay stage includes a plurality of delay elements.

9. The DTC of claim 7, wherein the first delay stage includes a plurality of delay elements and the second delay stage includes an interpolator.

10. A radio circuit comprising:
   a single local oscillator for generating a plurality of carrier signals, the plurality of carrier signals including a plurality of distinct frequencies, the single local oscillator configured to provide a single reference frequency signal;
   a plurality of digital-to-time converters (DTCs), each DTC of the plurality of DTCs configured to receive the single reference frequency signal and to provide a carrier signal of the plurality of carrier frequency signals;

wherein each DTC includes:

one or more delay stages for providing the carrier signal;

selection logic configured to receive a first code at a first instant, the first code representative of a frequency ramp for providing a first DTC delay, to provide a first delay setpoint to each of the one or more delay stages, to receive the first code at a second instant, and to provide a second delay setpoint to the one or more delay stages, wherein the first delay setpoint and the second delay setpoint provide the first DTC delay; and wherein the selection logic is configured to select components of at least one of the one or more delay stages differently using the first delay setpoint and the second delay setpoint to provide the first DTC delay.

11. The DTC of claim 1, wherein the first delay setpoint and the second delay setpoint provide the first DTC delay.

12. The radio circuit of claim 10, wherein one of the delay stages of the one or more delay stages includes a first delay path and a second delay path;

wherein the second delay path is a representative of the first delay path; and wherein the first delay setpoint is configured to select the first delay path at the first instant to provide the first DTC delay, and wherein the second delay setpoint is configured to select the second delay path at the second instant to provide the first DTC delay.

13. The radio circuit of claim 12, wherein the first delay path includes a first delay element of one of one of the one or more delay stages, and wherein the second delay path includes a second delay element of the one of the one or more delay stages.

14. The radio circuit of claim 10, wherein the one or more delay stages includes a first delay stage and a second delay stage;

wherein the first delay setpoint is configured to provide a first delay of the first delay stage and a first delay of the second delay stage;

wherein the second delay setpoint is configured to provide a second delay of the first stage; and wherein the first delay of the first delay stage is different from the second delay of the first delay stage.

15. The radio circuit of claim 14, wherein the first delay stage includes a divider stage; and wherein the second delay stage includes a plurality of delay elements.

* * * * *